US011848926B2

(12) United States Patent
Keisala et al.

(10) Patent No.: US 11,848,926 B2
(45) Date of Patent: Dec. 19, 2023

(54) NETWORK AUTHENTICATION

(71) Applicant: Telia Company AB, Stockholm (SE)

(72) Inventors: Ilkka Keisala, Espoo (FI); Joni Rapanen, Espoo (FI); Jari Kotomaki, Espoo (FI); Tommi Saranpaa, Jorvas (FI); Niko Suominen, Helsinki (FI); Timo Tunturi, Espoo (FI); Patrik Maltusch, Espoo (FI)

(73) Assignee: TELIA COMPANY AB, Solna (SE)

(*) Notice: Subject to any disclaimer, the term of this patent is extended or adjusted under 35 U.S.C. 154(b) by 171 days.

(21) Appl. No.: 15/370,413

(22) Filed: Dec. 6, 2016

(65) Prior Publication Data
US 2017/0163627 A1    Jun. 8, 2017

(30) Foreign Application Priority Data
Dec. 7, 2015  (FI) .................................... 20155924

(51) Int. Cl.
*H04L 9/00* (2022.01)
*H04L 9/40* (2022.01)
*H04W 12/069* (2021.01)

(52) U.S. Cl.
CPC ......... *H04L 63/083* (2013.01); *H04W 12/069* (2021.01); *H04L 63/0815* (2013.01); *H04L 63/0876* (2013.01); *H04L 63/0892* (2013.01)

(58) Field of Classification Search
CPC ............... H04L 63/083; H04L 63/0892; H04L 63/0815; H04L 63/0876; H04L 9/3226;
(Continued)

(56) References Cited

U.S. PATENT DOCUMENTS

| 6,618,584 | B1 * | 9/2003 | Carneheim | ......... H04W 12/06 455/410 |
|---|---|---|---|---|
| 2004/0066769 | A1 * | 4/2004 | Ahmavaara | ......... H04L 63/029 370/338 |
| 2004/0162998 | A1 * | 8/2004 | Tuomi | ................. H04L 63/083 726/3 |

(Continued)

FOREIGN PATENT DOCUMENTS

| EP | 2 378 708 A1 | 10/2011 |
|---|---|---|
| EP | 2 924 944 A1 | 9/2015 |

(Continued)

OTHER PUBLICATIONS

Pulkkis G, Yazdani F. Mobile certificate based network services. InProceedings of the Informing Science and Information Technology Education Conference Jul. 1, 2013 (pp. 413-428). Informing Science Institute. (Year: 2013).*

(Continued)

*Primary Examiner* — Daniel B Potratz
*Assistant Examiner* — Syed M Ahsan
(74) *Attorney, Agent, or Firm* — NIXON & VANDERHYE (57) ABSTRACT

A method for determining an access right of a user terminal to a first network, wherein the user terminal (110) includes a subscription of a second network (150). The method includes: receiving (310) an access request message (240) including a data record for a user name and a data record for a password; determining (320) that the records are in a pre-determined format and that at least one of them includes data from which a subscriber identity for the second network is derivable; generating (330) an authentication request message from the access server (140) to a server (160) configured to perform authentication related tasks in the second network; receiving (340) information on the outcome of the authentication of the subscriber in the second network, (Continued)

generating (350) an acknowledgement to the user terminal (110) indicating right to access to the first network.

10 Claims, 3 Drawing Sheets

(58) Field of Classification Search
CPC .... H04L 63/10; H04W 12/069; H04W 12/06; G06F 21/45
See application file for complete search history.

(56) References Cited

U.S. PATENT DOCUMENTS

| | | | |
|---|---|---|---|
| 2007/0008937 | A1 | 1/2007 | Mody et al. |
| 2012/0264402 | A1 | 10/2012 | Zhang et al. |
| 2013/0225123 | A1 | 8/2013 | Adjakple et al. |
| 2013/0263234 | A1* | 10/2013 | Givoni ............... H04L 63/10 726/5 |
| 2013/0288644 | A1* | 10/2013 | Schroeder .......... H04W 12/062 455/411 |
| 2014/0165170 | A1* | 6/2014 | Dmitriev ............ H04W 12/069 726/7 |
| 2014/0293780 | A1 | 10/2014 | Faccin et al. |
| 2017/0118638 | A1* | 4/2017 | Zhang ................ H04W 12/068 |

FOREIGN PATENT DOCUMENTS

| | | | | |
|---|---|---|---|---|
| EP | 2924944 B1 | * | 3/2018 | ........ H04W 12/0602 |
| WO | 01/17310 A1 | | 3/2001 | |
| WO | WO-0117310 A1 | * | 3/2001 | .......... G06Q 20/425 |
| WO | 2015/085058 A1 | | 6/2015 | |

OTHER PUBLICATIONS

Pulkkis, G., & Yazdani, F. (Jul. 2013). Mobile certificate based network services. In Proceedings of the Informing Science and Information Technology Education Conference (pp. 413-428). Informing Science Institute. (Year: 2013).*

Pulkkis, Goran, and Farzan Yazdani. "Mobile certificate based network services." Proceedings of the Informing Science and Information Technology Education Conference. Informing Science Institute, 2013. (Year: 2013).*

European Search Report issued in Application No. 16 20 2591, dated Apr. 19, 2017.

Finnish Search Report, dated May 30, 2016, from corresponding Finnish Application.

Finnish Office Action issued in Application No. 20155924, dated Sep. 7, 2018.

* cited by examiner

NETWORK AUTHENTICATION

FIELD OF THE INVENTION

The invention concerns in general the technical field of network authentication. Especially the invention concerns utilization of information relating to a subscription of a telecommunication network for authentication to another service.

BACKGROUND OF THE INVENTION

The growth in a utilization of wireless local area networks (WLAN) has happened rapidly. One reason for this is that terminal devices of today are equipped with WLAN modems and thus capable of arranging the communication over the WLAN networks. This, in turn, has increased the availability of public WLAN networks in different locations. The WLAN networks are accessible either for a charge or for free.

A challenge with the free WLAN networks is that there is typically no any kind authentication required. In other words, the network provider is not aware of parties who are using the network. However, there may be need to identify the users for example in situations in which the network is utilized for illegal purposes. The requirement for identifying the users of the WLAN network may be required by authorities either currently or in the future in at least some countries.

Some known methods for authentication, which are also applicable for free WLAN networks, exist. First known method is based on a combination of a username and password. The problem with such a solution is that this requires a way to deliver the credentials to users. This is typically arranged by requesting a registration of users through a registration process. This is slow and frustrating process for users, especially when there is need to access multiple free networks. Usually username/password authentication is either a web-based login or is based on certain EAP type solution in which a large number of EAP methods are available i.e. EAP-TLS/EAP-TTLS. In addition, multiple vendor-specific methods exist. A second known method is based on a use of EAP-SIM (Extensible Authentication Protocol for GSM Subscriber Identity Module) or EAP-AKA (Extensible Authentication Protocol for UMTS Authentication and Key Agreement) mechanisms. EAP-SIM is used for authentication and session key distribution using the Subscriber Identity Module, wherein the communication between the SIM card and the Authentication Centre (AuC) replaces the need for a pre-established password. EAP-AKA, in turn, is a mechanism for authentication and session key distribution using the UMTS Subscriber Identity Module (USIM), which also provides a corresponding way to get rid of pre-established passwords as in EAP-SIM. The problem with EAP based solutions from commercial point of view, especially with EAP-SIM, EAP-AKA and EAP-AKA', is that they are telecom operator related as the SIM and USIM are delivered by operators. Thus, they cannot be used in other operators' networks (national roaming especially does not work), since the required MAP operation for authentication is often firewalled between the operators. Thus, the WLAN network provider shall make agreements to all telecom operators in order to offer the authentication for all possible users. In practice, this is not feasible.

Furthermore, a quite new entrant in the authentication field is so called mobile id which is a digital identity implemented on the subscriber identity module provided by telecom operators. The idea in the mobile id solution is that key-data is safely stored in the SIM card and it is accessible by services only when a user gives a personal identity number (PIN) specified to the mobile id. The safety arises also from the fact that a management of the SIM card is only possible for a telecom operator and thus access thereto is very limited.

Concluding above, there is clear need to create an easy to use authentication mechanism to be used in context of an accessing a WLAN network, or similar.

SUMMARY OF THE INVENTION

An objective of the invention is to present a method and a system for providing an authentication. Another objective of the invention is that the method and system provides a solution for authentication of a user in order to access data network. The objectives of the invention are reached by a method and a system as defined by the respective independent claims.

According to a first aspect, a method for determining an access right of a user terminal to a first network is provided wherein the user terminal comprises a subscription of a second network. The method comprises: receiving, in an access server, an access request message originated from the user terminal requesting access to the first network, the access request message comprising a data record for a user name and a data record for a password; determining that the data record for the user name and the data record for the password are in a pre-determined format and that at least one of them comprises data from which a subscriber identity for the second network is derivable; generating an authentication request message from the access server to a server configured to perform authentication related tasks in the second network based on subscriber information in response to a positive outcome of the determination, the authentication request message comprising the subscriber identity derived at least partly from at least one data record in the access request message; receiving, from the server, information on the outcome of the authentication of the subscriber in the second network; generating, in response to a receipt of a positive outcome of the authentication, an acknowledgement to the user terminal, the acknowledgement indicating right to access to the first network.

The step of determining may comprise a derivation of MSISDN number from at least one data record in the access request message.

The step of determining may comprise a derivation of MSISDN number or predefined user alias by inquiring it from a pre-determined location accessible by the access server on the basis of the information in the at least one data record in the access request message.

Moreover, the method may further comprise a step of manipulating a timer value of a timer defining a period of time given for the authentication procedure between the user terminal, access controller and the access server in response to a positive outcome of the determination.

According to a second aspect, a system for determining an access right of a user terminal to a first network is provided wherein the user terminal comprises a subscription of a second network. The system comprises: an access server configured to: receive an access request message originated from the user terminal requesting access to the first network, the access request message comprising a data record for a user name and a data record for a password; determine that the data record for the user name and the data record for the password are in a pre-determined format and that at least one of them comprises data from which a subscriber identity for the second network is derivable; generate an authentication request message; and a server configured to receive the authentication request message from the access server; perform authentication related tasks in the second network based on subscriber information in response to a positive outcome of the determination, the authentication request message comprising the subscriber identity derived at least partly from at least one data record in the access request message; and wherein the system the authentication server is further configured to: receive, from the server, information on the outcome of the authentication of the subscriber in the second network; and generate, in response to a receipt of a positive outcome of the authentication, an acknowledgement to the user terminal, the acknowledgement indicating right to access to the first network.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DETAILED DESCRIPTION OF THE INVENTION

Figure 1:
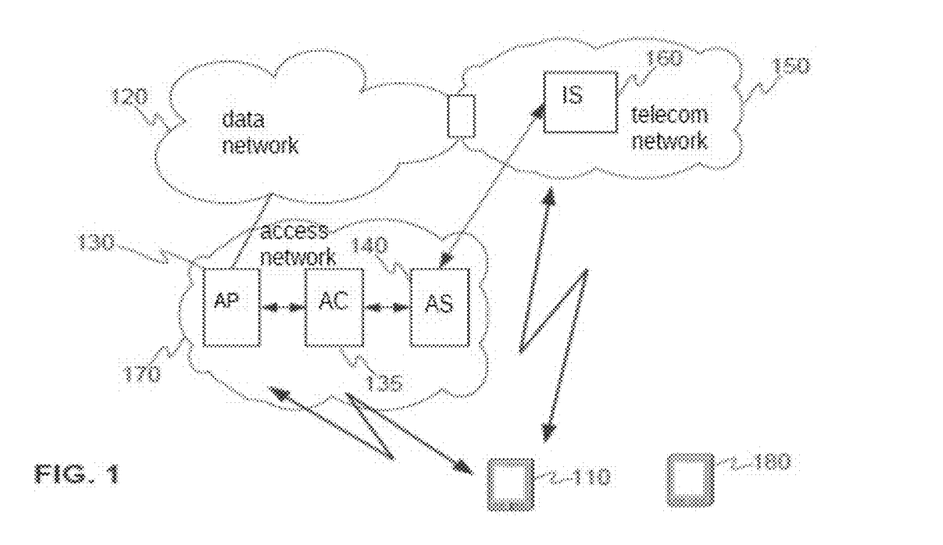
FIG. 1 illustrates schematically an environment in which an implementation of an embodiment of the invention is shown.

FIG. 1 illustrates the environment and entities participating in an implementation of the invention. A user terminal 110 equipped with a subscriber identity module (SIM) is moving within an area. The user terminal 110 enters a location where an access to a data network 120, such as Ethernet network like Internet, is provided through a wireless network 170, such as a short-range wireless communication network. The short-range wireless communication network may be implemented with a wireless local area network (WLAN) technology complying e.g. one or more IEEE 802.11 standards. The wireless access may be implemented with an access point 130 comprising a wireless access means, such as a WLAN modem, complying with the WLAN standard in question, in order to provide an interface to the data network 120, such as Internet, and additionally an interface to any other entities. The interface to the data network may be implemented either in a wired or wireless manner, the described solution works in both networks. An example of the access point 130 is a wireless local area network router. In an exemplified implementation according to FIG. 1 the access to the data network 120 is arranged through an access controller unit 135 and access server 140 that are communicatively coupled to the access point 130. The access controller unit 135 is configured to control access to the network and operates in response to information on access rights received from the access server 140.

In order to access the data network 120 the user of the user terminal 110 shall be identified. In order to perform the authentication the access controller unit 135 is communicatively coupled to the access point 130. Access controller unit 135 is communicatively coupled to the access server 140. The access server 140 is configured to manage the authentication and authorization procedures when a user terminal initiates the access to the short-range wireless communication network and also to store user related information on users who are allowed to access the data network through access point 130 through an authentication mechanism as will be described. Additionally, an interface to a telecommunication network 150, such as a mobile communication network, is arranged to the access server 140. More specifically, the access may be arranged to an identification server 160 residing in the telecommunication network 150 or in any other network, which servers are at least configured to maintain subscription related information and perform identification related processes as will be described later. The user terminal 110 and the identification server 160 may also communicate together for implementing the invention. The access server 140 may reside in the access network or in the operator network, such as within the identification server 160. The access server may the implemented with a hardware implementation, with a software implementation or with a combination of these. The identification server 160 may, in some implementation of the invention, reside in the access network 170 providing localized authentication services according to the present invention or any other network. The communication, as will be described later, may be arranged through the telecommunication network 150. In some implementations a part of the functionalities of the identification server 160 may be arranged in the access network 170 and part of the functionalities of the identification server 160 in the telecommunication network. The coordination of the operation in such an implementation is preferably arranged in either of these networks 150, 170. In an exemplified implementation as depicted in FIG. 1 the access to the data network is arranged through the access point 130 that operates according to information received from access server 140. In such a situation the access server 140 is configured to communicate with the access point 130 in order to provide necessary instructions for granting the access to the data network through the access point 130. In some other implementation the access to the data network may be arranged through the access controller unit 135.

The authenticating user terminal 110 needs not necessarily be the one to whom the network access to the data network is requested and arranged. Namely, the authenticating user terminal 110 may only perform the authentication related tasks but the data network access is performed with another user terminal 180. In such an implementation the authenticating user terminal may e.g. display the access information to the user who then manually inputs the information to the accessing user terminal 180. Alternatively or in addition, the user terminals 110 and 180 may be arranged to communicate either wirelessly or in a wired manner with each other wherein the authenticating user terminal 110 provides the access to the data network 120.

Figure 2:
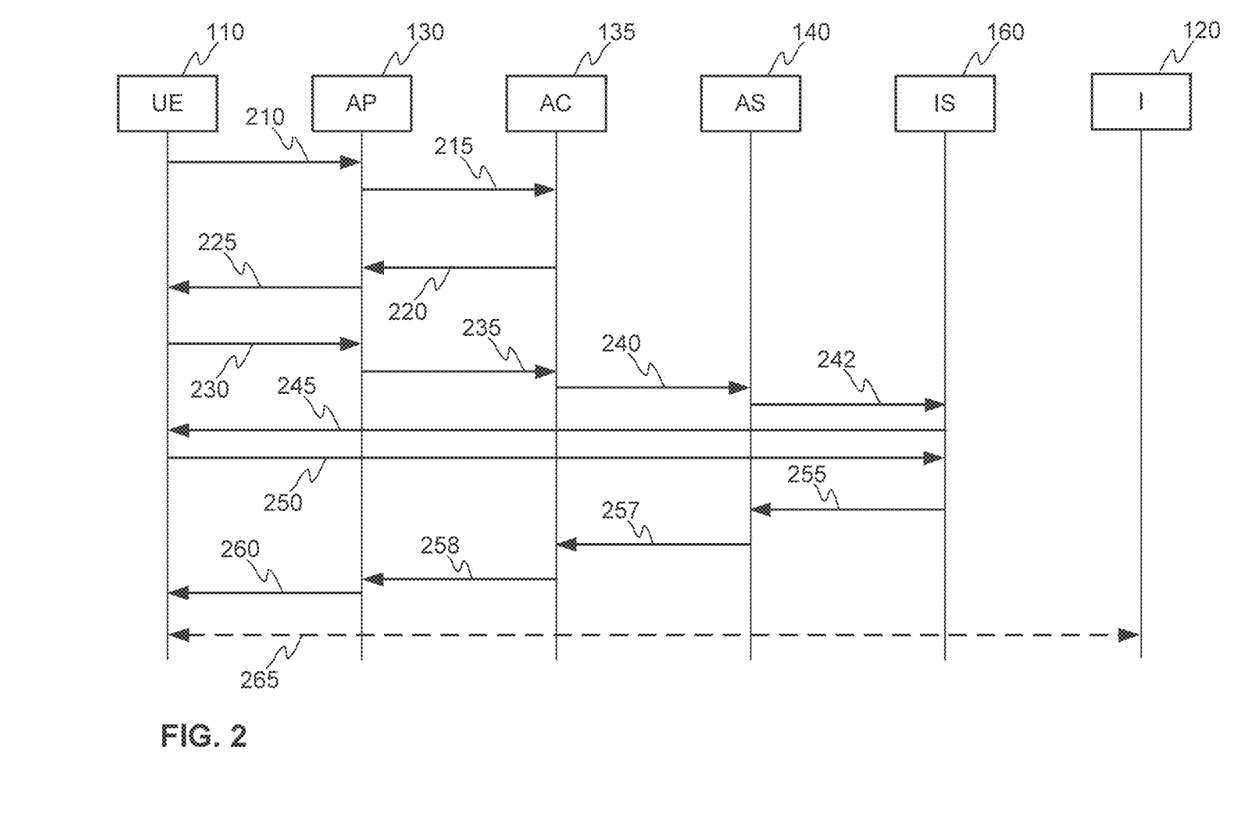
FIG. 2 illustrates schematically an implementation of an embodiment of the invention as a flow chart.

Next an example of the present invention is described with a signal flow as illustrated in FIG. 2. The access controller unit 135 and access server 140 are described as separate entities in order to better illustrate their role in this context. A user terminal 110 has entered in an operational area of an access point 130 that may provide access to a data network 120 for the user terminal 110 over a short-range communication network, such as WLAN. The user terminal 110 is equipped with necessary hardware and software implementations for detecting available short-range communication network, initiating an access in it and accessing it if allowed. This may be arranged either automatically or in response to a predefined action, such as a user action. More specifically, the user terminal may be configured to detect one or more available short-range communication networks by e.g. monitoring and detecting so called service set identifiers (SSID) broadcast by the access points 130. The SSID is an identifier attached to the header of packets sent over the short-range wireless communication network, which differentiates the networks from another. In response to the detection of one or more short-range wireless communication network the user terminal 110 may be configured to initiate access to a short-range wireless communication network by indicating to a network 210, i.e. access point 130, that it is willing to access to the network in question. The indication may be given through user actions or even automatically, for example, if the user has so defined in settings of the user terminal. As the access indication is given to the network the access point 130 may be configured to forward the indication 215 to an access controller unit 135. The access controller unit 135 may be configured to perform some predetermined actions and e.g. deliver data to the user terminal through the access point 130 (arrows 220, 225). The data may cause the user terminal to prompt predetermined information from the user. The predetermined information comprises at least two data record fields, wherein the first one refers to a user name and the second one refers to a password. The at least two data record fields may, for example, be implemented in a web page, which is shown, i.e. data is delivered, to the user through the user terminal 110 in response to the access indication. According to the present invention the user inserts the user name and the password data in the corresponding data records in predetermined format. The format is advantageously known by the user for situations as described. According to the invention the user inserts in at least one of the data records a piece of information by means of which a subscriber identity of the user for the second network, i.e. for the telecommunication network, may be derived. According to a first embodiment of the invention identity for the second network, i.e. telecommunication network, is directly input by the user in at least one of the data records, which is thus directly derivable from the input. The identity may be MSISDN (Mobile Station International Subscriber Directory Number), which identifies a subscription, i.e. SIM card, in the telecommunication network. The subscriber related identification information is not limited to MSISDN, but it may be any other by means of which the subscription may be identified either directly or indirectly i.e. IPv6 based or email type identity. For example, the identity information may alternatively be IMSI (International Mobile Subscriber Identity), but it may be impractical due to the fact that it is typically unknown to the user. According to a second embodiment of the invention the identity information may be so called alias information that may be utilized in the access network for determining identity for the second network. If the information input to the data record is alias, a database is arranged in the access network in order to map a subscriber identity, such as MSISDN, for the second network by means of the alias information and in such a manner to derive the subscriber identity for the second network. The database may be configured to be accessible by at least one network element, such as access server 140, of the access network 170 for the mapping purposes. Even it is described above so that the user manually inputs information into at least one of the data records it may also be arranged so that client software, such as the authentication client, is configured to store information for at least one required data record. For example, the password may be static, i.e. fixed, which is stored in the memory of the device executing the client software and retrieved from there when necessary, e.g. when a user inputs MSISDN number, or similar in the user name field linked to the password. In some implementation the user may have input, or the information may be stored by any other party, in a memory and when the authentication client is activated the data records are inserted automatically with the stored pieces of information. Moreover, the delivery of the data records automatically inserted may also be automatic or manual.

As said the user terminal 110 is configured to deliver access request 230 comprising the mentioned pieces of information in the data records in a predetermined format to the access point 130, which forwards 235 the received information to the access controller unit 135 and then further to the access server 140 (referred with signaling 240). The access server 140 may be configured to analyze the access request so that it is configured to check the format of the access request as well as derive necessary information from it. The derivation of information may be implemented as described above i.e. directly from at least one of the data records or from a database, or from any other entity, by utilizing alias information in at least one of the data records. The predetermined format refers herein to an idea in which the predetermined format of the data records is configured to indicate to the access server 140 how the authentication of the user shall be handled and done. As one inventive idea of the present invention is to utilize services provided by the telecommunication network 150 for the authentication the format of the data records are arranged so that the access server 140 is configured to request authentication service from the telecommunication network 150, as will be described. The format of the data records, i.e. user name and password, may vary. In the following table some preferred, but non-limiting, implementations are disclosed:

|   | USERNAME | PASSWORD |
|---|---|---|
| A | MSISDN | [empty field] |
| B | [empty field] | MSISDN |
| C | MSISDN | MSISDN |
| D | ALIAS | [empty field] |
| E | [empty field] | ALIAS |
| F | MSISDN | Pre-defined universal password |
| G | ALIAS | Pre-defined universal password |

At least some of these may be used together i.e. for example option A and option D may be configured to operate at the same time. Namely, the empty password field may indicate to the access server 140 that for the authentication of the user network resources from the telecommunication network 150, i.e. from the second network, shall be used. In case of the alias as the username the network controller is configured to derive the MSISDN information from a database. Use of empty field as a data record is advantageous due to several reasons. First of all, the user experience is good since the user needs not input extra data in the data records requested, but also for a reason that the utilization of network resources is minimized since the amount of data to be transferred between entities is minimized.

As a result, the access server 140 has analyzed the access request and data in the data records, which indicate that resources of the telecommunication network 150 shall be used for authentication of the user in order to provide him/her services of the access network 170, i.e. WLAN access. In order to request authentication service from the telecommunication network the access server 140 is configured to determine the network address of an identification server 160 residing in the telecommunication network 150. The address may e.g. be stored in a memory of the access server 140, which is to be fetched in response to a decision that the telecommunication network 150 shall perform at least some of the authentication procedure. Next the access server 140 is configured to deliver an authentication request 242 to the identification server 160 residing, for example, in the telecommunication network 150. The identification server 160 may also reside in some other network but the telecommunication network 150, and it may be accessed through the telecommunication network or through any other network. The identification server 160 receives the authentication request message 242 and is configured to determine the subscription related identification information, such as MSISDN information or any other pre-agreed identification information, from the authentication request message 242. The authentication request message 242 may also comprise some other information, such as a predetermined piece of information utilized in the authentication procedure according to the invention as will be described later. The some other information may be added to the authentication request message 240 by the access server 140, for example. An example of the some other information may be an authentication digest, such as a random number, which is delivered further through the authentication request message 242.

Next, the identification server 160 is configured to compose and send an identification request message 245 ("a challenge") to the user terminal carrying the subscription, whose identification information is determined. The identification request message 245 may e.g. be SMS, MMS or some other message, implemented e.g. over a signaling in the telecommunication network. Alternatively or in addition, it may be a message delivered through a data connection over a telecommunication network, or another communication network. The identification server 160 may also convert the subscriber identity MSISDN of the request message 245 to another format i.e. IPv6 or email type identity. The identity in another format may be obtained from a database accessible to the identification server 160 or by inquiring the information from any network entity with which the identification server may communicate to. If MSISDN is used as the identification information the identification server 160 may directly utilize the number as a destination address for the identification request message 245. Alternatively, if some other information unique to the user in the telecommunication network is used for identifying the subscriber, a database may be arranged e.g. in the identification server 160 or accessible to the server, which comprises a transformation table to transform the identification information in use to a pre-stored MSISDN corresponding the identification information. For example, the database may reside in the access server or be a separate network node. As the user terminal 110 receives the identification request message 245 in a predetermined format it is configured to initiate an access request to the subscriber identity module. The subscriber identity module responds with a request of an access code from the user. The user is prompted to insert an access code through a user interface of the user terminal 110. The access code input by the user is configured to be confirmed by the subscriber identity module by comparing it with a correct access code stored in the subscriber identity module. Advantageously, the correct access code is stored in a so called secure element of the subscriber identity module. The secure element is a secure storage and execution environment in a smart card, such as in the subscriber identity module, which may store information, such as cryptographic keys and similar. If the access code input by the user is correct, an identification confirmation message 250 is composed and returned to the identification server 160 from the user terminal 110. If the access code input by the user is not correct, the access code may be re-prompted from the user for a predetermined number of times. Alternatively or in addition, a rejection message may be composed and delivered to the server, which may initiate an access cancellation procedure for preventing the user terminal 110 to access the short-range wireless communication network. In other words, the interaction of the user and the user terminal 110 relating to the access code inquiry and confirmation produces an indication on a successful identification of the user of the user terminal 110, when the access code given by the user is correct, which indication may be delivered to the identification server 160. Above it is disclosed that the access code to the data stored in the subscriber identity module is confirmed by the subscriber identity module. This can also be arranged in such a manner that a specific application installed and executed in the user terminal memory retrieves an identification request, requesting user to insert correct PIN. If PIN is OK, indication may be delivered to the identification server 160. In alternative implementation pressing designated OK button may confirm the identification request.

In the following it is assumed that the access code given by the user is correct and a confirmation message is delivered to the identification server 160. The identification server 160 is configured to compose an authentication information message 255 to the access server 140, wherein the authentication information message 255 may comprise predetermined identification information on the user i.e. the owner of the subscription of the user terminal 110 inquired from the identification server 160, or any other entity, such as a database, accessible to the identification server. The inquiry may be performed on the basis of the original identification information on the subscriber, which is delivered from the access server 140 to the identification server 160 in the message 242. Alternatively, the information to be used in the inquiry may be derived from the identification confirmation message 250 that carries at least some identification information on the subscriber. The predetermined identification information on the user in the authentication information message 255 may be, but is not limited to, a name of a person owning the subscription, date of birth or social security number, or any similar to these or their combination. The access server 140, in response to a receipt of the authentication information message 255 with the predetermined information, is configured to store the identification information on the subscriber requesting the access to the short-range wireless communication network and provide an access accept to the access controller unit 135 (referred with signaling 257). The access controller unit 135 may be configured to inform access point 130 that the user terminal is granted an access to a data network through a short-range wireless communication network (referred with signal 258). As a result the user terminal 110 may be informed that the access is granted 260. Alternatively or in addition the access may be established. As a result the user terminal 110 may start utilizing 265 the short range wireless connection, such as WLAN, for accessing to the data network 120, such as to the internet. In FIG. 2 and in the corresponding description it is described that the access to the data network is arranged through the access controller unit. In some other implementation the access may be arranged directly through the access point 130. In such a situation the access controller unit may be configured to communicate with the access point 130 in order to provide necessary instructions for granting the access to the data network through the access point 130. The access controller unit 135 is described above as a network element which performs WLAN access related tasks, such as connection management. The access server performs authentication and authorization related tasks, such as derivation of the user identity for the telecommunication network from a database and creating Access Accept or Access Denied messages for the Access Controller. In some implementation a network element may be configured to perform the described tasks of access controller unit and the access server in the same network element.

In some other advantageous example of the invention the digital signature feature is utilized in the identification request message 245 and the procedure initiated from the receipt of the identification request message 245 in the user terminal 110. In such an example of the invention the predetermined format of the identification message is such that it comprises at least an authentication digest, such as a random number, which is intended to the secure element of the subscriber identity module for signing it digitally. The piece of information in the authentication digest may be received in the authentication request message 240 from either the access point 130 through the access server 140 or from the access server 140 adding the authentication digest in the authentication request message 240. In response to the receipt of the authentication digest, the access attempt to the secure element is configured to initiate an access code inquiry from the user. If the input code by the user is correct, the secure element of the subscriber identity module is configured to digitally sign the authentication digest with a private key, or similar, and the digitally signed authentication digest is returned to the server in the identification confirmation message 250. The receipt of the identification confirmation message 250 with the digitally signed authentication digest is configured to cause the identification server 160 to determine the digitally signed authentication digest from the identification confirmation message 250 and to retrieve at least a user public key from a database accessible by the identification server 160. The retrieval of information may be based at least partly on the digitally signed authentication digest. In addition to the retrieval of the user certificate some other user related information may be retrieved from the database, such as a name of a person owning the subscription, date of birth or social security number, or any similar to these or their combination. Finally, depending on the implementation and required security some information is configured to be delivered to the access server 140 in the authentication information message 255.

The information may be some piece or pieces of information retrieved from the database, such as user related information and/or user certificate. In some implementation the delivered information may also comprise the digitally signed authentication digest. The access server 140 may be configured to determine from the received authentication information message 255 the necessary pieces of information and in response to a positive outcome of the determination, i.e. receipt of pre-defined piece of identification information, the access server 140 is configured to procedure a message to access controller unit to grant an network access for user entity for example in a similar way as described earlier in this document.

According to some further example of the invention the user terminal 110 may be configured to identify from the service set identifier (SSID) that the short-range communication network supports a certain authentication mechanism i.e. inquiry to the server as described above. Thus, the access point 130 according to a present invention is advantageously arranged to send SSID, which indicates that the access point 130 supports a certain authentication mechanism. The indication may be inbound to information which is exchanged between the user terminal and the access point e.g. during the handshake procedure. The indication may e.g. be inserted to a specific data field, such as SS ID field which is length of 0 to 32 octets, within the SSID element, and the user terminal 110 may be configured to detect if the indication exists or not in the SSID information.

According to some example of the present invention the correct access code stored in the secure element of the subscriber identity module may be encrypted. The server may provide a key to decrypt the encrypted correct access code in connection with the authentication request message 240. Alternatively or in addition, the encryption and decryption of the access code may be performed with a public and secret key pair in which the public key may be delivered from the server to the user terminal.

Figure 3:
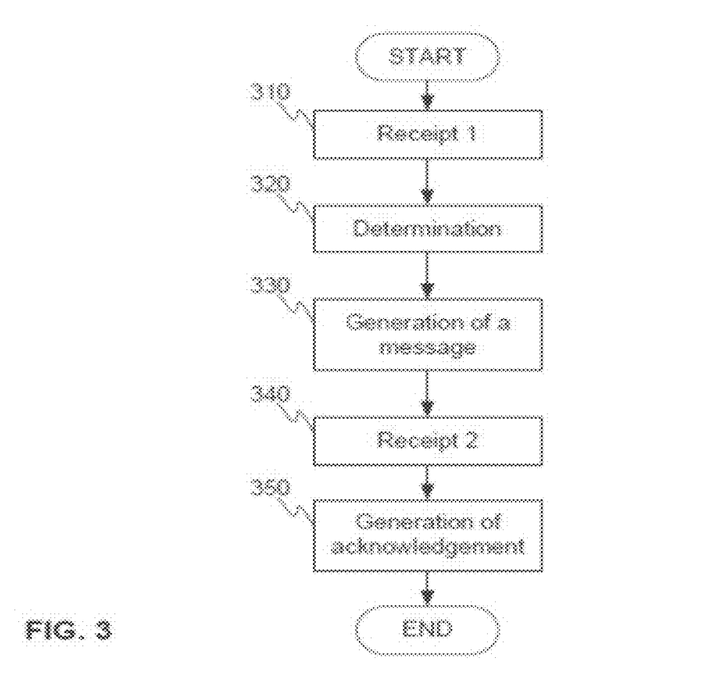
FIG. 3 illustrates schematically a method according to an embodiment of the invention.

Next an example of the present invention is described from the access server 140 point of view by referring to FIG. 3. As described, an access server 140 is configured to receive 310 an access request message with information in a predetermined format. The access server 140 may also be configured to determine 320 subscriber identity, such as MSISDN number, from the message. Alternatively or in addition, the access server 140 determines the MSISDN number on the basis of the determined subscriber related information in the access request message from a transformation table stored in a location accessible by the access server 140, as described earlier. In response to the determination of the MSISDN number and determination that the data records are in a predetermined format the access server 140 is configured to generate 330 an authentication request message to a server configured to perform authentication related tasks in the second network based on subscriber information. The authentication request message advantageously comprises the subscriber identity derived at least partly from at least one data record in the access request message. The identification server 160 is configured to deliver information on an outcome of the authentication of the subscriber in the second network to the access server 340. In response to a receipt of a positive outcome of the authentication, the access server is configured to generate an acknowledgement to the access controller unit to forward for access point and finally to user terminal 110 wherein the acknowledgement indicates right to access to the first network. Naturally, if the outcome of the authentication is negative, this may be information to the user terminal, and/or the procedure may be cancelled.

Figure 4:
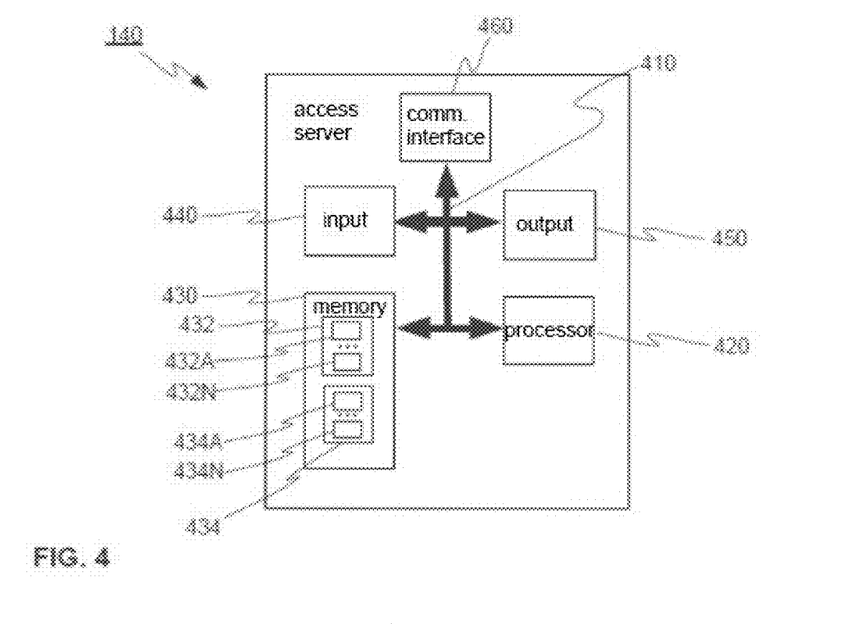
FIG. 4 illustrates schematically a server according to an embodiment of the invention.

FIG. 4 illustrates an example of an access server 140, which is configured to implement the method as described above. The server 400 comprises, for example, a bus 410, a processor 420, a memory 430, input means 440, output means 450, and a communication interface 460. The bus 410 may include means or methods that enable communication among the elements of the server 400. The term 'server' shall be understood to cover any computing device comprising necessary hardware and computer program code stored in a memory, which may be configured to implement the method as described.

The processor 420 may comprise one or more conventional processors, one or more microprocessors, or one or more processing logics, or any combination of these, that interprets and executes instructions defined by portions of computer program code. The memory 430 may comprise a random access memory (RAM) 432 and/or a read only memory (ROM) 434. The RAM 432 may store information and instructions in a form of portions of computer program code 432A-432N for execution by the processor 420. The ROM 434 may include a conventional ROM device or another type of a static storage device that is configured to store static information and instructions in a form of portions of computer program code 434A-434N for use by the processor 420. The RAM 432 and ROM 434 may be implemented with one or more corresponding memory elements.

The input means 440 may comprise a conventional mechanism that permits inputting information to the access server 140, such as a keyboard, a mouse, a pen, a touch screen, voice recognition and/or biometric mechanisms, CD/DVD/Blue-ray drive etc. The output means 450 may comprise a conventional mechanism that outputs information, including a display, a printer, a speaker, etc. The input and output means are not necessarily implemented into the access server 140, but may be coupled to the access server 140 with some known interfaces either wirelessly or in a wired manner when needed. In some examples of the invention the server does not comprise any input means 440 or output means 450 as the server operates as a standalone entity, which is controlled externally through the communication interface 460.

The communication interface 460 may enable the access server to communicate with other elements and/or servers, but also with networks, as well as with client terminals either directly or indirectly.

The access server 140 may perform the operations as described above in response to the processor 420 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 460. The software instructions may cause the processor 420 to perform method steps and processes as described and thus to enable the operation of the access server 140 according to an example of the invention.

As said, FIG. 4 illustrates an example of the access server according to the invention. The elements as disclosed in FIG. 4 do not necessarily exist in all implementations of the access server. For example, the access server may not comprise input means 440 and output means 450, but the access server 140 may be accessed through the communication interface 460 with applicable devices and servers. As well, the number and type of memories may vary. Further, the amount of portions of computer program code may depend on the implementation. The implementation of the identification server 160 may be similar as the illustration of the access server 140 in FIG. 4. However, the portions of computer program code define instructions, when executed by the at least one processor, that cause the identification server to operate as described.

Figure 5:
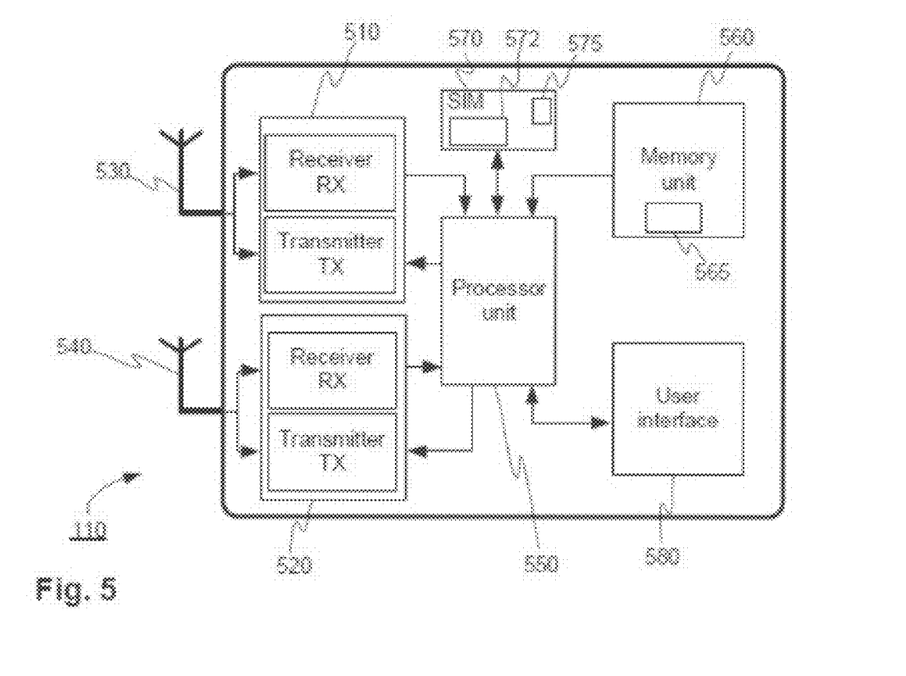
FIG. 5 illustrates schematically a user terminal according to an example of the invention.

FIG. 5 illustrates a user terminal according to an example of the invention. The user terminal 110 is configured to access the telecommunication network 150 complying a known telecommunication technology, such as GSM or UMTS for example. The user terminal 110 may be configured to access database within telecommunications network 150 either directly or indirectly. Additionally, the user terminal 110 is configured to access a short-range wireless communication network, such as WLAN. In order to enable the accesses the user terminal is equipped with corresponding hardware and software implementations, such as GSM/UMTS modem 510 and WLAN modem 520, which provide interfaces to the corresponding networks. The modems 510, 520 typically comprise a transmitter and receiver parts as illustrated in FIG. 5 into which applicable antennas 530, 540 are coupled to. Additionally, the user terminal 110 comprises at least one processor unit 550 and one or more memory units 560. Moreover, the user terminal 110 is equipped with a subscriber identity module (SIM) 570, which is typically a telecom operator provided smart card inserted in the user terminal with known manner. Alternatively or in addition, the functionalities of the smart card 570 may be implemented with a software solution, which is executed by the processor unit. The user terminal 110 also comprises a user interface 580, which enables the exchange of information between the user and the user terminal in a manner as described especially in the description of FIG. 2. The mentioned elements are arranged to communicate with each other under control of the processor unit 550. Moreover, the user terminal 110 may comprise an application 565 according to some example of the invention, which is arranged to participate in the operation of the present invention by executing the application with the processor unit 550 of the user terminal 110. The application is implemented with computer program code, which application 565 may be stored in the memory unit of the user terminal 110. The application is configured to cause the user terminal 110, when the application is executed by the processor unit 550, to detect available short-range wireless communication networks and identify, on the basis of the network identifier if the network in question supports the authentication method as described. The application may prompt the user to input the MSISDN, or any other identity, through the user interface and send the information to the access point providing the short-range wireless communication network. Alternatively, the application may be implemented so that it automatically, e.g. in response to a detection of a short-range wireless communication network, inquires the MSISDN, or some other applicable subscription identifier, from subscriber identity module or from specific terminal application, and prompts user to send it, or even automatically sends it to the access point. A further implementation may be that a web page in a predetermined format is delivered to the user terminal (e.g. into a browser residing in the user terminal), when the data network access is requested. The web page may e.g. be such that it requests an input of information, such as MSISDN number or some other identification information on the user. Furthermore, the user terminal 110 may comprise an access to another application 575 residing in the subscriber identity module 570. The application 575 when executed in cooperation of the processor unit of the user terminal 110 is configured to detect a received identification request message 245 in the user terminal and to initiate accessing to the secure element 572 of the subscriber identity module 570, which causes an access code request from the user as described above. When the user inputs the access code, the application 575 is configured to confirm the input access code and if it is correct, the application 575 is configured to instruct the application 565 residing in the user terminal 110 to compose identification confirmation message 250 and return it to the server. Additionally, the application 565 may be configured to monitor the short-range wireless communication connection, when it is established. It may also be arranged to store information, such as SSID information, on the networks in which the authentication mechanism as described is used for the user. In such a manner the user may find out the information afterwards if needed. Worthwhile to mention is that the FIG. 5 does not necessarily comprise all elements needed for a user terminal, but only those which may have relevance in describing and understanding the present invention.

As becomes clear from the description here one aim of the invention is to provide an authentication of a user by utilizing commonly known EAP authentication protocol in a novel manner e.g. EAP-TLS or EAP-TTLS, both on client and server side. A timer value is typically set for the EAP authentication in order to limit the period of time needed for the authentication. Some aspects of the present invention relate to a manipulation of the timers in order to perform the authentication related tasks in the telecommunications network. The timers might be present in the access point, access controller unit, access server or in any other element that is related to the authentication related to the first network, i.e. WLAN network. According to an embodiment of the present invention the access server, when generating the authentication request message to the identification server 160, may be configured to manipulate the timer value defined for the authentication procedure. This may be done e.g. when the authentication request message is delivered to the server, or e.g. in response to a detection that the data records received in the access request message are in pre-determined format and at least one of them comprises data from which subscriber identity for the second network may be derived. The manipulated timer value shall be such that the authentication in the second network may be performed and information on the outcome of it is delivered to the access server so that the authentication procedure between the user terminal and the access controller as well access server is maintained.

In the description of advantageous examples of the invention above it is mainly described a situation in which the user terminal requesting the access to the short-range wireless communication network is the same as the one participating in the authentication procedure. However, the present invention is not limited thereto. In some implementation the user terminal requesting the access to the network may be different than the one participating to the authentication process. This may be implemented so that the user terminal requesting access provides information on the other user terminal that shall be utilized in the authentication. The information on the other user terminal may also be inserted to an application residing in the user terminal requesting the access, which piece of information is automatically included in the access request. For example, the user of the user terminal requesting the network access may input a destination address, such as MSISDN number, of the terminal, which is a preferred entity for the authentication. In such a case the server according to the present invention is configured to initiate the delivery and to deliver the identification request message 245 into the other user terminal. The type of the user terminal requesting access to the network is not limited anyhow, but may for example be a laptop computer, tablet, mobile terminal without subscriber identity module, smart TV and so on as long as the device comprises necessary equipment for accessing a data network through the network into which the access is requested. The other user terminal to be utilized in the authentication is preferably such that it comprises the subscriber identity module, or similar data structure, which can be utilized according to the present invention in the authentication.

In the description it is described that the service requested by the user terminal is to get an access to a desired network. The invention is not, as such, limited only to such service request. The service request may relate to any other service in which the authentication may be arranged in the same way as described herein. Naturally, the messages as described in the context of requesting access to a network shall be adjusted so that a service in question may be requested by the user terminal.

In the description above it is mainly disclosed communication to and from the access server 140. However, the description does not cover any detailed description on the telecommunication network in which the server may be residing, nor on any other network in which the access server may reside. The telecommunication network comprises the well-known network elements and entities, which enable the communication between the elements in the network and with any external network or element to the telecommunication network. Thus, they are not described in more detailed manner herein.

The description above mainly refers to a situation in which the subscriber, i.e. the user of the user terminal, inquires an access to a short-range wireless communication network. The target network for the access may also be any other network than a short-range wireless communication network, such as a fixed network, which may be available to the user if the authentication is successful in a manner as described.

In some other advantageous example of the invention the digital signature feature is utilized in the identification request message 245 and the procedure initiated from the receipt of the identification request message 245 in the user terminal 110. In such an example of the invention the predetermined format of the identification message is such that it comprises at least an authentication digest, such as a random number, which is intended to the secure element of the subscriber identity module for signing it digitally. The piece of information in the authentication digest may be received in the access request message 230 from either the access point 130 through the access controller unit or from the access server 140 adding the authentication digest in the access request message 230. In response to the receipt of the authentication digest, the access attempt to the secure element is configured to initiate an access code inquiry from the user. If the input code by the user is correct, the secure element of the subscriber identity module is configured to digitally sign the authentication digest with a private key, or similar, and the digitally signed authentication digest is returned to the server in the identification confirmation message 250. The receipt of the identification confirmation message 250 with the digitally signed authentication digest is configured to cause the identification server 160 to determine the digitally signed authentication digest from the identification confirmation message 250 and to retrieve at least a user public key from a database accessible by the identification server 160. The retrieval of information may be based at least partly on the digitally signed authentication digest. In addition to the retrieval of the user public key, certificate, or some other user related information may be retrieved from the database, such as a name of a person owning the subscription, date of birth or social security number, or any similar to these or their combination. Finally, depending on the implementation and required security some information is configured to be delivered to the access server 140 in the authentication information message 255. The information may be some piece or pieces of information retrieved from the database, such as user related information and/or user certificate. In some implementation the delivered information may also comprise the digitally signed authentication digest. The access server 140 may be configured to determine from the received authentication information message 255 the necessary pieces of information and in response to a positive outcome of the determination, i.e. receipt of pre-defined piece of identification information, the access controller 140 is configured to procedure grant an access to the network for example in a similar way as described earlier in this document.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for determining an access right of a user terminal to a first network, the user terminal including a subscription of a second network, the method comprising:

identifying, by the user terminal, that the first network supports a server inquiry-based authentication mechanism, the identifying being performed by the user terminal based on an identifier sent by an access point of the first network;

generating, by the user terminal, an access request message in accordance with the identified server inquiry-based authentication mechanism;

receiving, in an access server from the access point, the access request message originated from the user terminal requesting access to the first network through the access point, the access request message comprising a data record for a user name and a data record for a password;

determining, by the access server, that the data record for the user name and the data record for the password are in a predetermined format and that at least one of the data records comprises subscriber identity data from which a subscriber identity for the second network is derivable;

generating, by the access server, an authentication request message to be transmitted from the access server, the authentication request message comprising the subscriber identity derived at least partly from at least one data record in the access request message;

transmitting the authentication request message to an authentication server configured to perform authentication-related tasks in the second network and residing in the second network, based on subscriber information in response to a positive outcome of the determination, the authentication server being remote from the subscriber module and the user terminal;

in response to a receipt of the authentication request message from the access server, generating, by the authentication server, an identification request message to the user terminal to cause a request of an access code from the user by the user terminal to initiate access to a secure element of the subscriber module residing in the user terminal;

transmitting, from the authentication server, the identification request message directly to the user terminal through the second network;

receiving the identification request message at the user terminal, providing data to be digitally signed to the secure element, and initiating an access request by the user terminal to the subscriber module upon receipt of the identification request message at the user terminal by the authentication server;

responding to the access request, by the subscriber module residing in the user terminal, by requesting the access code from the user;

receiving, at the user terminal, the requested access code;

determining, at the user terminal, whether the requested access code matches a stored access code stored in a subscriber module residing in the user terminal;

generating, at the user terminal, an identification confirmation message when the requested access code is determined to match the stored access code, the received access code providing access to the secure element of the subscriber module residing in the user terminal to generate authentication data included in the generated identification confirmation message, the data to be digitally signed being digitally signed by the secure element of the subscriber module in response to the requested access code being determined to match the stored access code, the digitally signed data representing the authentication data;

receiving, at the authentication server from the user terminal, the identification confirmation message, when a receipt of the requested access code at the user terminal matches the stored access code stored in the subscriber module residing in the user terminal;

receiving, in the access server, from the authentication server, information on a positive outcome of the authentication of the subscriber in the second network; and generating, in response to receiving the positive outcome of the authentication, an acknowledgement to the user terminal, the acknowledgement indicating right to access to the first network.

2. The method of claim 1, wherein the determining that the at least one of the data records comprises the subscriber identity data from which the subscriber identity for the second network is derivable comprises deriving a Mobile Station International Subscriber Directory Number (MSISDN) from at least one data record in the access request message.

3. The method of claim 1, wherein the determining that the at least one of the data records comprises the subscriber identity data from which the subscriber identity for the second network is derivable comprises deriving a Mobile Station International Subscriber Directory Number (MSISDN) or predefined user alias by inquiring the MSISDN or the predefined user alias from a predetermined location accessible by the access server based on the information in the at least one data record in the access request message.

4. The method of claim 1, further comprising manipulating a timer value of a timer defining a period of time given for an authentication procedure between the user terminal, an access controller, and the access server in response to a positive outcome of the determination.

5. The method of claim 2, further comprising manipulating a timer value of a timer defining a period of time given for an authentication procedure between the user terminal, an access controller, and the access server in response to a positive outcome of the determination.

6. The method of claim 3, further comprising manipulating a timer value of a timer defining a period of time given for an authentication procedure between the user terminal, an access controller, and the access server in response to a positive outcome of the determination.

7. The method of claim 1, wherein the user terminal initiates the requesting access to the first network by generating and transmitting the access request message to the access server.

8. The method of claim 1, wherein the identification request message generated by the authentication is in a predetermined format and is transmitted from the authentication server directly to the user terminal.

9. A system for determining an access right of a user terminal to a first network, the user terminal including a subscription of a second network, the system comprising:
   an access server comprising one or more hardware processors configured to:
      receive, from the access point, an access request message originated from the user terminal requesting access to the first network through the access point, the access request message comprising a data record for a user name and a data record for a password, the access request message being generated by the user terminal in accordance with a server inquiry-based authentication mechanism identified by the user terminal as being supported by the first network, based on an identifier sent by an access point of the first network,
      determine that the data record for the user name and the data record for the password are in a predetermined format and that at least one of the data records comprises subscriber identity data from which a subscriber identity for the second network is derivable,
      generate an authentication request message to be transmitted from the access server, the authentication request message comprising the subscriber identity derived at least partly from at least one data record in the access request message, and
      transmit the authentication request message; and
   an authentication-performing server residing in the second network, the authentication-performing server being remote from the subscriber module and the user terminal, the authentication-performing server comprising one or more hardware processors configured to
      receive the transmitted authentication request message from the access server, and
      perform authentication-related tasks in the second network based on subscriber information in response to a positive outcome of the determination, the authentication request message comprising the subscriber identity derived at least partly from at least one data record in the access request message, the authentication-related tasks including
         in response to a receipt of the authentication request message from the access server, generating, by the authentication-performing server, an identification request message to the user terminal to provide data to be digitally signed to the secure element of the subscriber module and to cause a request of an access code from the user by the user terminal to initiate access to a secure element of a subscriber module residing in the user terminal to generate authentication data,
         transmitting, from the authentication-performing server, the identification request message directly to the user terminal through the second network,
         receiving, from the user terminal, an identification confirmation message that carries the subscriber information when the identification request message is received at the user terminal, an access request is initiated by the user terminal to the subscriber module, the subscriber module residing in the user terminal responds to the access request by requesting the access code from the user, the user terminal receives the requested access code, the requested access code is determined to match a stored access code stored in the subscriber module residing in the user terminal, and the data to be digitally signed is digitally signed by the secure element of the subscriber module when the requested access code is determined to match the stored access code, the digitally signed data representing the authentication data, and
   wherein the access server is further configured to:
      receive, from the authentication-performing server, information on a positive outcome of the authentication of the subscriber in the second network in an identification confirmation message, the information including predetermined identification information of the user, and
      generate, in response to the positive outcome of the authentication, an acknowledgement to the user terminal, the acknowledgement indicating right to access to the first network.

10. A method for determining an access right of a user terminal to a first network, the user terminal including a subscription of a second network, the method comprising:
   identifying, by the user terminal, that the first network supports a server inquiry-based authentication mechanism, the identifying being performed by the user terminal based on an identifier sent by an access point of the first network;
   generating, by the user terminal, an access request message in accordance with the identified server inquiry-based authentication mechanism;
   receiving, in an access server from the access point the access request message originated from the user terminal requesting access to the first network through the access point, the access request message comprising a data record for a user name and a data record for a password;
   determining, by the access server, that the data record for the user name and the data record for the password are in a predetermined format and that at least one of the data records comprises subscriber identity data from which a subscriber identity for the second network is derivable;
   generating, by the access server, an authentication request message to be transmitted from the access server, the authentication request message comprising the subscriber identity derived at least partly from at least one data record in the access request message;
   transmitting the authentication request message to an authentication server configured to perform authentication-related tasks in the second network and residing in the second network, based on subscriber information in response to a positive outcome of the determination, the authentication server being remote from the subscriber module and the user terminal;

in response to a receipt of the authentication request message from the access server, generating, by the authentication server, an identification request message to the user terminal to cause a request of an access code from the user by the user terminal to initiate access to a secure element of the subscriber module residing in the user terminal;

transmitting, from the authentication server, the identification request message directly to the user terminal through the second network;

receiving the identification request message at the user terminal, the identification request message comprising at least an authentication digest, and initiating an access request by the user terminal to the subscriber module upon receipt of the identification request message at the user terminal;

responding to the access request, by the subscriber module residing in the user terminal, by requesting the access code from the user;

receiving, at the user terminal, the requested access code;

determining, at the user terminal, whether the requested access code matches a stored access code stored in a subscriber module residing in the user terminal;

generating, at the user terminal, an identification confirmation message when the requested access code is determined to match the stored access code, the received access code providing access to the secure element of the subscriber module residing in the user terminal to generate authentication data included in the generated identification confirmation message, the secure element of the subscriber module digitally signing the authentication digest in response to the requested access code being determined to match the stored access code, the digitally signed authentication digest being provided in the identification confirmation message and representing the authentication data included in the generated identification confirmation message;

receiving, at the authentication server from the user terminal, the identification confirmation message, when a receipt of the requested access code at the user terminal matches the stored access code stored in the subscriber module residing in the user terminal;

receiving, in the access server, from the authentication server, information on a positive outcome of the authentication of the subscriber in the second network; and generating, in response to receiving the positive outcome of the authentication, an acknowledgement to the user terminal, the acknowledgement indicating right to access to the first network.

\* \* \* \* \*